United States Patent
Jung

(10) Patent No.: US 7,986,714 B2
(45) Date of Patent: Jul. 26, 2011

(54) APPARATUS AND METHOD FOR TRANSMITTING PACKETS IN WIRELESS NETWORK

(75) Inventor: Hye-young Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1085 days.

(21) Appl. No.: 11/600,195

(22) Filed: Nov. 16, 2006

(65) Prior Publication Data

US 2007/0109996 A1   May 17, 2007

(30) Foreign Application Priority Data

Nov. 16, 2005   (KR) .................. 10-2005-0109906

(51) Int. Cl.
  *H04J 3/22* (2006.01)
  *H04L 1/18* (2006.01)
(52) U.S. Cl. .............. 370/469; 714/748; 714/749
(58) Field of Classification Search ....... 370/229–326.2, 370/469; 714/748–754; 455/7, 504
  See application file for complete search history.

(56) References Cited

U.S. PATENT DOCUMENTS

| | | | |
|---|---|---|---|
| 6,788,687 B2 * | 9/2004 | Bao et al. ................. | 370/394 |
| 2003/0086391 A1 | 5/2003 | Terry et al. | |
| 2003/0115331 A1 | 6/2003 | Xie et al. | |
| 2003/0210660 A1 | 11/2003 | Wiberg et al. | |
| 2004/0023660 A1 | 2/2004 | Ben-Eli | |
| 2005/0259663 A1 | 11/2005 | Ode et al. | |

FOREIGN PATENT DOCUMENTS

| | | |
|---|---|---|
| JP | 63-250223 A | 10/1988 |
| JP | 10-276178 A | 10/1998 |
| JP | 2005-295108 A | 10/2005 |
| KR | 10-2003-0055331 A | 7/2003 |
| KR | 10-2001-0098482 A | 11/2003 |
| WO | 2004075589 A1 | 9/2004 |

* cited by examiner

*Primary Examiner* — Patrick N Edouard
*Assistant Examiner* — Huy C Ho
(74) *Attorney, Agent, or Firm* — Sughrue Mion, PLLC

(57) ABSTRACT

Provided is an apparatus and method for transmitting packets in a wireless network. The apparatus includes a motion calculation unit, a transmission repetition adjustment unit, and a packet transmission repetition unit. The motion calculation unit calculates the motion value of a mobile terminal. The transmission repetition adjustment unit receives N-value determination information and determines the number of repetitions (N value) of transmission of a packet transmitted and received by the mobile terminal based on the received N-value determination information, and the motion value calculated by the motion calculation unit. The packet transmission repetition unit repeatedly transmits the packet, which is received from a data link layer, to a physical layer according to the N value determined by the transmission repetition adjustment unit.

14 Claims, 5 Drawing Sheets

APPARATUS AND METHOD FOR TRANSMITTING PACKETS IN WIRELESS NETWORK

CROSS-REFERENCE TO RELATED APPLICATION

This application claims priority from Korean Patent Application No. 10-2005-0109906 filed on Nov. 16, 2005 in the Korean Intellectual Property Office, the disclosure of which is incorporated herein by reference in its entirety.

BACKGROUND OF THE INVENTION

1. Field of the Invention

The present invention relates to an apparatus and a method for transmitting packets in a wireless network and, more particularly, to an apparatus and method for transmitting packets in a wireless network, which adjusts the number of repetitions of transmission of a packet according to the extent of motion of a mobile terminal.

2. Description of the Related Art

As the use of wireless terminals is becoming more popular due to the development of wireless communication technology, the users of wireless terminals desire to receive stable communication service that enables the uninterrupted transmission and reception of packets even during movements at high speeds, through the wireless terminals. A process in which data is transmitted between mobile terminals based on communication layers is described below with reference to FIG. 1.

FIG. 1 is a diagram showing the flow of data transmission based on the communication layers of a conventional mobile terminal. The communication layers shown in FIG. 1 may be regarded as some of the layers of the Open Systems Interconnection (hereinafter abbreviated as the 'OSI') reference model. The OSI reference model is a communication-related standard model established to support uninterrupted connections between different types of computers or networks, and is divided into seven layers. The functions of the respective layers are as follows:

First, layer 1 (the physical layer 40) is responsible for transmitting a bitstream, which is transmitted from an upper layer, through a transmission medium in a specific electrical signal form. Second, layer 2 (the data link layer 30) is responsible not only for transmitting data blocks, which are formed by signal-level data bits passing through the physical layer, but also for handling a synchronization problem, which occurs when identifying the start and end of each data block, and an error problem, which occurs when detecting errors and performing restoration. Third, layer 3 (the network layer 20) constructs an invisible logical link between a transmission side and a reception side, is responsible for dividing data into packets, transmitting the packets, and assembling the packets, and provides a routing function of searching for optimal transmission paths for packets. Fourth, layer 4 (the transport layer 10) is responsible not only for establishing and maintaining connections between users and between computers, but also for providing logical stability and uniform service between transmission and reception systems. Fifth, layer 5 (the session layer) is responsible for establishing sessions, thereby providing a synchronization function to achieve the sequential flow of dialogue without interruption. Sixth, layer 6 (the presentation layer) is a layer handling a method of presenting data, and is responsible for providing a standard interface that enables the presentation of different data. Seventh, layer 7 (the application layer) is the uppermost layer, and functions as a path through which a user's application program accesses a network environment.

The 7 layers of the OSI are divided into two groups. The upper layer group (the transport layer, the session layer, the presentation layer, and the application layer) is used by the user to send and receive messages, while the lower layer group (the physical layer, the data link layer, and the network layer) functions to allow the message to pass through a host.

The flow of data transmission of FIG. 1 is applied to the packet transmission of a wireless terminal data, which is conveyed from the session layer, is divided into segments and is assigned numbers, an error detection code is added thereto, and the flow of communication is controlled. While packets, which are created by layer 7 (the application layer), pass via layer 6 (the presentation layer) and layer 5 (the session layer), and layer 4 (the transport layer). A routing function of searching for an optimal path, through which the packet is transmitted to the destination, is performed while the packet passes through layer 3 (the network layer). Synchronization and error problems are resolved and the packet is transferred to layer 1, that is, the next layer, while the packet passes through layer 2 (the data link layer). The packet will wirelessly arrive at the destination through layer 1 (the physical layer).

In a related art technology for performing the above-described process of transmitting packets, packet loss does not occur frequently in an environment in which motion is low, so the packet transmission rate is high even though the transmission method is used without change. However, in an environment featuring a lot of motion, such as the case in which mobile terminals are used in mobile means moving at high speeds, the packet loss rate increases and, therefore, packets are frequently retransmitted. Accordingly, when packets are frequently retransmitted, problems occur in that the traffic of an overall network increases, so that the packet loss rate increases and, at the same time, the time for which the packet transmission is delayed gradually increases. Accordingly, a scheme for solving the problems is required in the environment featuring a lot of motion.

SUMMARY OF THE INVENTION

Accordingly, the present invention has been made keeping in mind the above problems occurring in the prior art, and an aspect of the present invention is to provide an apparatus and a method for transmitting packets in a wireless network, which solve problems, such as packet loss and packet transmission delay, that occur at the time of wireless communication using a mobile terminal in a fast movement environment, thus being capable of reducing the packet loss and the packet transmission delay time.

In order to accomplish the above aspects, the present invention provides an apparatus for transmitting packets in a wireless network, the apparatus including a motion calculation unit calculating the motion value of a mobile terminal; a transmission repetition adjustment unit receiving N-value determination information and determining N value, which is a number of repetitions of transmission of a packet transmitted and received by the mobile terminal based on the motion value calculated by the motion calculation unit and the received N-value determination information; and a packet transmission repetition unit repeatedly transmitting a packet, which is received from a data link layer, to a physical layer according to the N value determined by the transmission repetition adjustment unit.

In addition, the present invention provides a method of transmitting packets in a wireless network, the method including receiving N-value determination information for determining a number N of repetitions of transmission of a packet; determining N value based on the received N-value determination information; and repeatedly transmitting the packet, which is received from a data link layer, to a physical layer according to the determined N value.

BRIEF DESCRIPTION OF THE DRAWINGS

The present invention will now be described in detail by describing illustrative, non-limiting embodiments thereof with reference to the accompanying drawings, in which.

DESCRIPTION OF THE EXEMPLARY EMBODIMENTS

Figure 1:
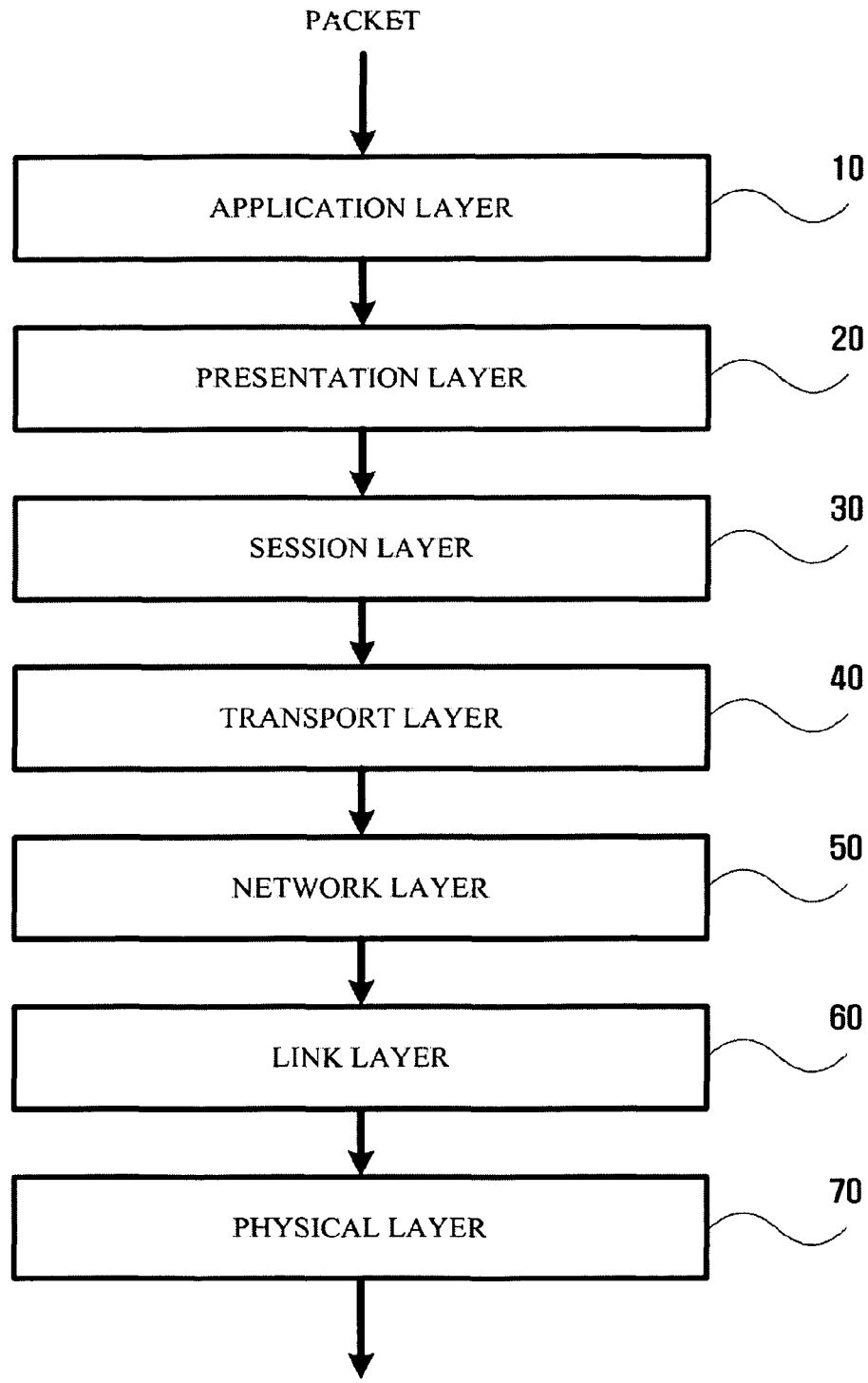
FIG. 1 is a diagram showing the flow of data transmission according to the communication layers of a related art mobile terminal.

The aspects and characteristics of the present invention, and the method of achieving them, will be apparent with reference to the exemplary embodiments described in detail later in conjunction with the accompanying drawings. However, the present invention is not limited to the exemplary embodiment disclosed below, but may be implemented in various ways. Furthermore, the exemplary embodiments are provided to complete the disclosure of the present invention, and to fully notify those skilled in the art of the scope of the present invention. The present invention is defined only by the appended claims. The same reference numerals are used throughout the different drawings to designate the same or similar components.

An apparatus and method for transmitting packets in a wireless network, which are illustrated using an exemplary embodiments of the present invention, are described in detail with reference to the accompanying drawings below.

Figure 2:
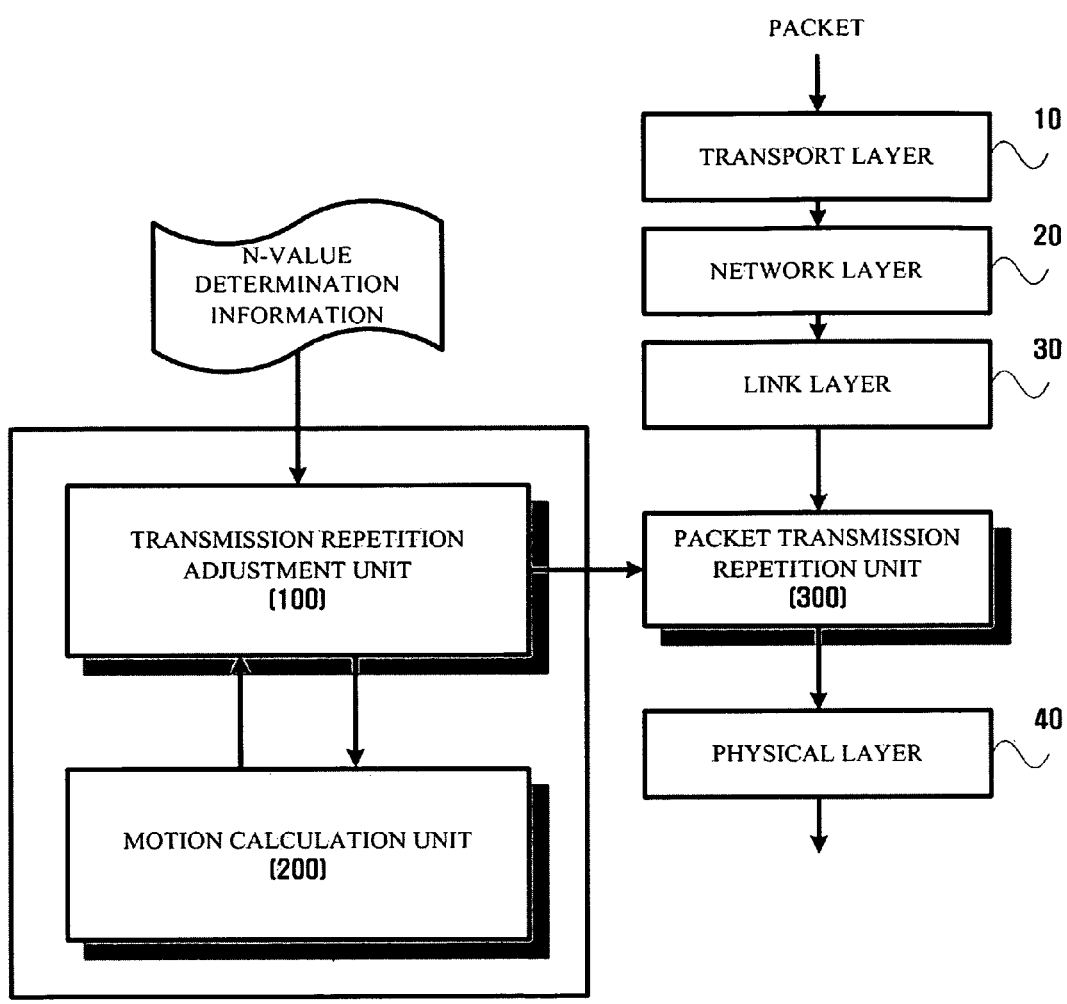
FIG. 2 is a block diagram showing the overall construction of an apparatus for transmitting packets according to an exemplary embodiment of the present invention.
Figure 3:
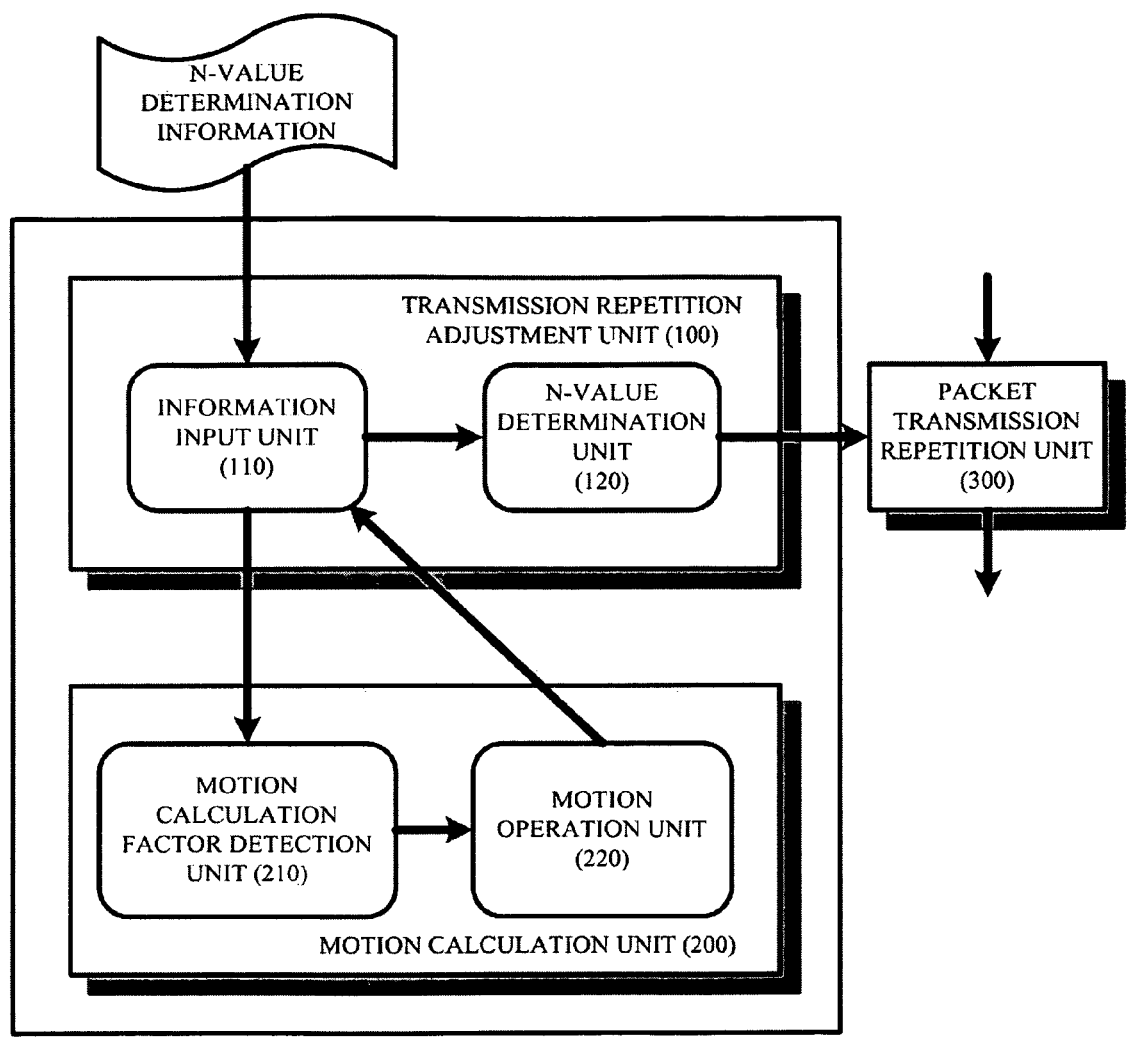
FIG. 3 is a block diagram showing the construction of the apparatus for transmitting packets according to the exemplary embodiment of the present invention in detail.

FIG. 2 is a block diagram showing the overall construction of an apparatus for transmitting packets according to an exemplary embodiment of the present invention, and FIG. 3 is a block diagram showing the construction thereof in detail.

The packet transmission apparatus, as shown in FIG. 2, includes a transmission repetition adjustment unit 100, a motion calculation unit 200, and a packet transmission repetition unit 300.

The transmission repetition adjustment unit 100 functions to receive N-value determination information, for determining the number of repetitions of transmission of a packet, which is attained by repeatedly transmitting the packet transmitted and received by a mobile terminal in a wireless mobile communication, and to determine N value based on the received N-value determination information. In this case, the term 'packet' refers to a bundle of data. Packets are transmitted using a method in which data is not successively transmitted between two points but data to be transmitted is divided into appropriately sized packets, and the packets are transmitted one by one. Each of the packets includes predetermined size data and control information about a data reception address or control code. Furthermore, the N-value determination information includes a motion calculation factor for calculating the motion value of a mobile terminal that transmits and receives the packets, and initial information values for calculating the N value. In this case, the initial information values include a minimum motion value $\alpha$, which is a threshold value for repeated transmission, and an upper limit value $N_{max}$, which represents an upper limit for the number of repetitions of transmission of a packet. Descriptions of the minimum motion value and the upper limit value $N_{max}$ for the number of repetitions of transmission of a packet will be given later with reference to FIG. 4. The motion calculation factor is exemplified by variation in the reception power of the host per unit of time, or variation in the distance between a base station and a mobile terminal.

Meanwhile, as depicted in FIG. 3, the transmission repetition adjustment unit 100 includes an information input unit 110 and an N-value determination unit 120. The information input unit 110 receives N-value determination information including the motion calculation factor and the initial information values, and functions to extract the values a and $N_{max}$ through a process of processing a message as needed. Furthermore, the information input unit 110 may function to receive the motion value of the mobile terminal from the motion operation unit 220 in the motion calculation unit 200. Meanwhile, the N-value determination unit 120 receives the initial information values, including the extracted values $\alpha$ and $N_{max}$, from the information input unit 110. Furthermore, the N-value determination unit 120 receives information about the motion value from the information input unit 110. The motion value and the initial information values, including the values a and $N_{max}$, are input, and the N value is determined using a predetermined algorithm, a detailed description of which is given later.

The motion calculation unit 200 functions to calculate the motion value of a mobile terminal that transmits and receives packets and to provide information about the motion value to the transmission repetition adjustment unit 100. A description of the construction of the motion calculation unit 200 is given in detail with reference to FIG. 3. The motion calculation unit 200 includes a motion calculation factor detection unit 210 and a motion operation unit 220. The motion calculation factor detection unit 210 functions to detect and collect a motion calculation factor from the information input unit 110 of the transmission repetition adjustment unit 100 that receives the motion calculation factor from a system manager. The motion operation unit 220 functions to receive the motion calculation factor from the motion calculation factor detection unit 210 and to perform an operation on the motion value of the mobile terminal using the factor. Since the method of performing an operation on the motion by the motion operation unit 220 is a known technology, a detailed description thereof is omitted in an exemplary embodiment of the present invention.

Meanwhile, information about the motion value, operated by the motion operation unit 220, is transferred to the information input unit 110 of the transmission repetition adjustment unit 100 again. As described above, the information input unit 110, which has received the motion value from the motion operation unit 220, notifies the N-value determination unit 120 of the information about the motion value. Accordingly, the N-value determination unit 120, which has received the motion value, determines the N value based on information about the initial information values (the values $\alpha$ and $N_{max}$) which are already known, and the process of determining the N value using the predetermined algorithm used for determining the N value is described in detail with reference to FIG. 4.

Figure 4:
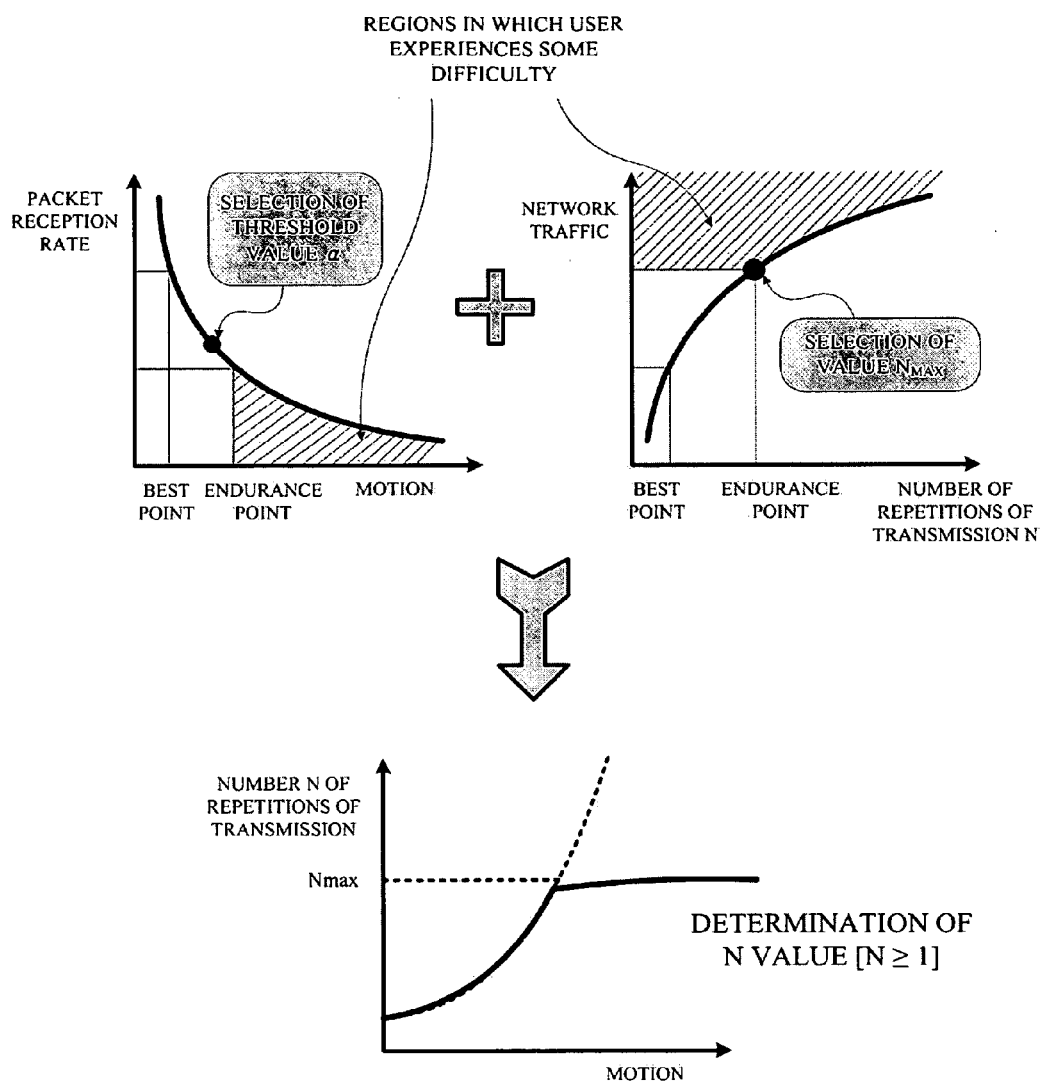
FIG. 4 is a diagram showing a process of determining the number N of repetitions of transmission of a packet in the apparatus for transmitting packets according to an exemplary embodiment of the present invention.

FIG. 4 is a diagram showing a process of determining the number N of repetitions of transmission of a packet in the apparatus for transmitting packets according to an exemplary embodiment of the present invention. The minimum motion value α, which is a threshold value in motion calculation, can be selected with reference to the upper left graph of FIG. 4. The horizontal axis represents motion values, and the vertical axis represents packet reception rates. Since the packet reception rate increases in proportion to the decrease in motion and decreases in proportion to the increase in motion, there is an inversely proportional relationship between the motion and the reception rate. When passing through "Best point" and arriving at "Endurance point," the packet reception rate is remarkably reduced and, thereby, a user experiences some difficulty when performing communication. For this reason, the minimum motion value α is selected between "Best point" and "Endurance point". Accordingly, when the motion value is equal to or smaller than the value α, the packet reception rate is good, so that it is not necessary to repeatedly transmit packets. Therefore, it is not necessary to calculate the N value. In contrast, when the motion value is greater than the value α, the packet reception rate is lowered, so that it is necessary to repeatedly transmit packets. Therefore, it is necessary to calculate the N value.

The N value indicates the number of repetitions of transmission of a packet, and is used to prevent packet loss. When the N value is greater than a predetermined value, the traffic on a network increases and, thereby, transmission delay of packets occurs, so the N value must be restricted to an upper limit value. The upper right graph of FIG. 4 illustrates a process of selecting the upper limit value $N_{max}$. As can be seen in the graph, the number of transmission repetitions is restricted to the upper limit value $N_{max}$ regardless of an increase in the motion value. That is, when repeated transmission is performed above the upper limit value $N_{max}$, the network is loaded, so the upper limit value is restricted. Furthermore, the predetermined algorithm is implemented using the following equation:

$$N = e^z, (0 < N < N_{max})$$
$$Z = \frac{M - \alpha}{C}$$

where N is the number of repetitions of transmission of a packet, M is the motion value of a current mobile terminal, α, that is, a threshold value, as described above, is the minimum motion value, that is, a reference value for calculating the number N, $N_{max}$ is the upper limit value for the N value, and C is an adjustment constant.

From the equation, it can be seen that, since the difference between the current motion value and the minimum motion value α is used as the exponent of an exponential function, the N value increases exponentially in proportion to the increase in the difference. This is illustrated in the lower graph of FIG. 4. From the graph, it can be seen that the N value exponentially increases in proportion to the increase in the motion value, but is kept constant without increase from a certain moment, that is, when the upper limit value $N_{max}$.

Meanwhile, when the N value is determined in the above-described exemplary manner, the packet transmission repetition unit 300 receives information about the N value from the N-value determination unit 120, and repeatedly transmits packets, which are received from the data link layer 30 of the OSI reference model, to the physical layer 40 by N.

The term 'unit,' as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and be configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or may be further separated into additional components and modules. Furthermore, the components and modules may be implemented to operate on one or more Central Processing Units (CPUs) residing in a device or a security multimedia card.

Figure 5:
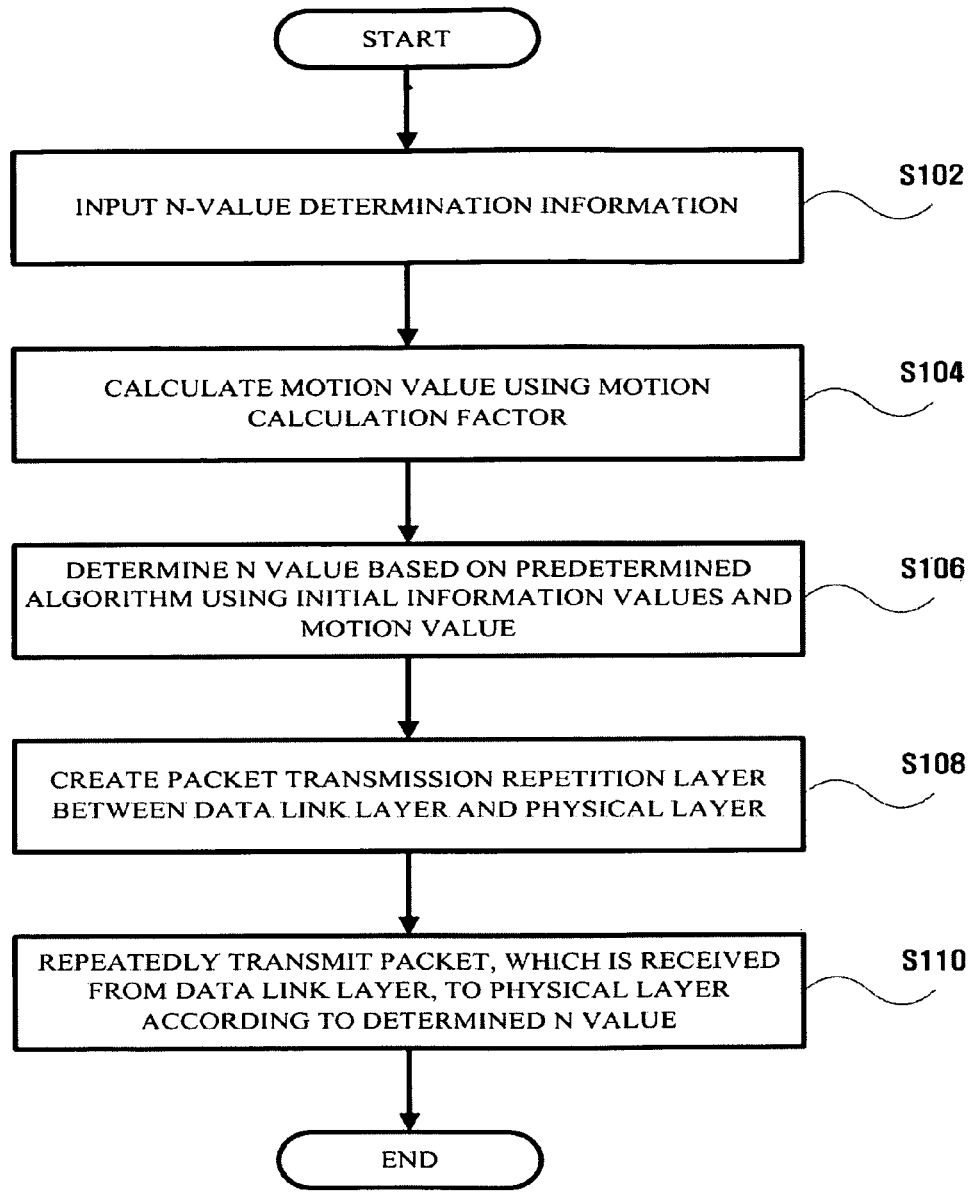
FIG. 5 is a flowchart illustrating a method of transmitting packets according to an exemplary embodiment of the present invention.

FIG. 5 is a flowchart illustrating a method of transmitting packets according to an exemplary embodiment of the present invention.

The method of transmitting packets is described with reference to FIG. 5 below. First, the information input unit 110 receives the N-value determination information for determining the number N of repetitions of transmission of a packet at operation S102. In this case, the N-value determination information includes a motion calculation factor for calculating the motion value of a mobile terminal that transmits and receives the packets, and initial information values for calculating N value. The initial information values include a minimum motion value α, which is a reference value for repeated transmission, and an upper limit value $N_{max}$, which represents an upper limit for the number of repetitions of transmission of a packet.

Meanwhile, the N-value determination unit 120 performs a process of determining the N value based on the received N-value determination information, a description of which is given below. Operation S104 of the motion calculation unit 200, which calculates the motion value of a mobile terminal using the motion calculation factor received from the information input unit 110, is performed. The method of calculating the motion value is a known technology, a detailed description of which is omitted. The information input unit 110 receives again information about the motion value calculated as described above and transfers the received information to the N-value determination unit 120. The N-value determination unit 120, which has received the information, determines the N value based on a predetermined algorithm using the motion value and previously collected fundamental information values at operation S106. The predetermined algorithm is implemented using the following equation:

$$N = e^z, (0 < N < N_{max})$$
$$Z = \frac{M - \alpha}{C}$$

where N is the number of repetitions of transmission of a packet, M is the motion value of a current mobile terminal, α, that is, a threshold value, described above, which is the minimum motion value, that is, a reference value for calculating the number N, $N_{max}$ is the upper limit value for the N value, and C is an adjustment constant.

Since a detailed description of the equation has been made in the description of the packet transmission apparatus, a repeated description is omitted.

Thereafter, operation S108 of creating the packet transmission repetition layer that is responsible for packet transmission repetition between the data link layer and the physical layer in the OSI reference model is performed, and operation S110 of repeatedly transmitting a packet, which is transferred from the data link layer, to the physical layer according to the information about the determined value is performed.

Meanwhile, it will be apparent to those skilled in the art that the scope of the present invention is extended to a computer-readable storage medium storing program code for executing the above-described exemplary method in a computer.

When the apparatus and the method for transmitting packets in a wireless network according to the exemplary embodiments of the present invention are used, the problems of packet loss and packet transmission delay that occur when performing wireless communication using a mobile terminal in a fast movement environment can be solved.

Furthermore, the exemplary embodiments of the present invention independently performs an operation on an existing data transport layer, so that stable communication can be provided in any wireless communication systems.

Effects of the present invention are not limited to the above-described effects, and other effects that are not described may be understood by those skilled in the art from the claims described below.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for transmitting packets in a wireless network, the apparatus comprising:
    a motion calculation unit, which calculates a motion value of a mobile terminal;
    a transmission repetition adjustment unit, which receives N-value determination information and determines a number of repetitions (N value) of transmission of a packet transmitted and received by the mobile terminal based on said N-value determination information and the motion value calculated by the motion calculation unit; and
    a packet transmission repetition unit, which repeatedly transmits the packet, which is received from a data link layer, to a physical layer according to the N value determined by the transmission repetition adjustment unit,
    wherein the N-value determination information comprises a motion calculation factor for calculating the motion value and initial information values for calculating the N value, wherein the initial information values comprise a minimum motion value, which is a reference value for repeated transmission, and an upper limit value, which represents an upper limit for the number of repetitions of transmission of the packet.

2. The apparatus of claim 1, wherein the motion calculation unit comprises:
    a motion calculation factor detection unit, which detects the motion calculation factor from the transmission repetition adjustment unit; and
    a motion operation unit, which receives the motion calculation factor detected by the motion calculation factor detection unit, and performs an operation on the motion value.

3. The apparatus of claim 2, wherein the transmission repetition adjustment unit comprises:
    an information input unit, which receives the N-value determination information and the motion value obtained by the operation performed by the motion operation unit; and
    an N-value determination unit, which receives the initial information values, which are included in the N-value determination information, and the motion value from the information input unit, and determines the N value using a predetermined operation.

4. The apparatus of claim 3, wherein the predetermined operation is implemented using the following equation:

$$N = e^z, (0 < N < N_{max})$$
$$Z = \frac{M - \alpha}{C}$$

where N is the number of repetitions of transmission of a packet, M is a motion value of a current mobile terminal, a is a minimum motion value, which is a reference value for calculating the number N, $N_{max}$ is an upper limit value for the N value, and C is an adjustment constant.

5. The apparatus of claim 3, wherein the motion calculation factor detection unit, which detects the motion calculation factor from the information input unit.

6. The apparatus of claim 3, wherein the packet transmission repetition unit repeatedly transmits the packet, which is received from the data link layer, to the physical layer according to the N-value determined by the N-value determination unit.

7. The apparatus of claim 4, wherein the packet transmission repetition unit repeatedly transmits the packet, which is received from the data link layer, to the physical layer according to the N value determined by the N-value determination unit.

8. The apparatus of claim 5, wherein the packet transmission repetition unit repeatedly transmits the packet, which is received from the data link layer, to the physical layer according to the N value determined by the N-value determination unit.

9. The apparatus of claim 1, wherein the motion calculation unit, the transmission repetition adjustment unit, and the packet transmission repetition unit are at least one of a field programmable gate area, an application specific integrated circuit, and a processor.

10. A method of transmitting packets in a wireless network, the method comprising:
    calculating a motion value of a mobile terminal;
    receiving N-value determination information for determining a number of repetitions (N value) of transmission of a packet;
    determining the N value based on the received N-value determination information and the motion value; and
    repeatedly transmitting a packet, which is received from a data link layer, to a physical layer according to the determined N value,
    wherein the N-value determination information comprises a motion calculation factor for calculating a motion value, and initial information values for calculating the N value, the initial information values comprising a minimum motion value, which is a reference value for repeated transmission, and the upper limit value, which represents an upper limit for the number of repetitions of transmission of a packet.

11. The method of claim 10, wherein the determining of the N value comprises:
    calculating the motion value of the mobile terminal using the motion calculation factor; and
    determining the N value based on a predetermined operation using the initial information values and the motion value.

12. The method of claim 11, wherein the predetermined operation is implemented using the following equation:

$$N = e^z, (0 < N < N_{max})$$
$$Z = \frac{M - \alpha}{C}$$

where N is the number of repetitions of transmission of a packet, M is a motion value of a current mobile terminal, a is a minimum motion value, which is a reference value for calculating the number N, $N_{max}$ is an upper limit value for the N value, and C is an adjustment constant.

13. The method of claim 12, wherein the repeated transmission of the packet comprises:
    creating a packet transmission repetition layer that is responsible for the repeated transmission of the packet between the data link layer and the physical layer; and
    the packet transmission repetition layer repeatedly transmitting the packet, which is received from the data link layer, to the physical layer according to the determined N value.

14. A non-transitory computer-readable medium storing program code for executing the method of claim 10.

* * * * *